United States Patent [19]
Verini

[11] Patent Number: 5,855,646
[45] Date of Patent: Jan. 5, 1999

[54] METHOD AND DEVICE TO MONITOR NITROGEN GAS PURITY DURING THE MANUFACTURE AND DISPENSING OF NITROGEN GAS

[76] Inventor: Nicholas A. Verini, 404 Lone Eagle Point, Lafayette, Colo. 80026

[21] Appl. No.: 861,853

[22] Filed: May 22, 1997

Related U.S. Application Data

[63] Continuation-in-part of Ser. No. 646,505, May 8, 1996, Pat. No. 5,688,306, which is a continuation-in-part of Ser. No. 503,596, Jul. 18, 1995, Pat. No. 5,588,984.

[51] Int. Cl.[6] .................................................. B01D 53/22
[52] U.S. Cl. ........................ 95/23; 95/54; 96/4; 96/422
[58] Field of Search .......................... 95/8, 12, 19, 22, 95/23, 45, 54; 96/4, 10, 417–422; 55/212, 218, 270, 274

[56] References Cited

U.S. PATENT DOCUMENTS

| | | | |
|---|---|---|---|
| 3,241,293 | 3/1966 | Pfefferle | 96/4 X |
| 3,295,359 | 1/1967 | Peck | 55/270 X |
| 3,604,246 | 9/1971 | Toren | 96/4 X |
| 3,715,866 | 2/1973 | Chatlos et al. | 55/270 X |
| 3,930,813 | 1/1976 | Gessner | 95/54 |
| 3,930,814 | 1/1976 | Gessner | 95/19 |
| 4,422,859 | 12/1983 | McGee | 55/274 X |
| 4,586,389 | 5/1986 | Vincent et al. | 55/270 X |
| 4,648,888 | 3/1987 | Rowland | 95/8 |
| 4,806,132 | 2/1989 | Campbell | 95/12 |
| 4,857,082 | 8/1989 | DiMartino, Sr. et al. | 95/19 |
| 5,053,058 | 10/1991 | Mitariten | 95/8 |
| 5,266,101 | 11/1993 | Barbe et al. | 95/23 |
| 5,281,253 | 1/1994 | Thompson | 95/22 |
| 5,302,189 | 4/1994 | Barbe et al. | 95/22 X |
| 5,308,382 | 5/1994 | Prasad | 95/12 |
| 5,388,413 | 2/1995 | Major et al. | 95/54 X |
| 5,439,507 | 8/1995 | Barbe et al. | 95/23 |
| 5,470,379 | 11/1995 | Garrett | 95/12 X |
| 5,496,388 | 3/1996 | Tellier | 96/4 X |
| 5,507,855 | 4/1996 | Barry | 95/54 X |
| 5,588,984 | 12/1996 | Verini | 95/19 X |
| 5,649,995 | 7/1997 | Gast, Jr. | 95/12 |
| 5,688,306 | 11/1997 | Verini | 95/19 X |

*Primary Examiner*—Robert Spitzer
*Attorney, Agent, or Firm*—John L. Isaac; Lee, Fishman & Isaac LLP

[57] ABSTRACT

A method and device indirectly monitors the purity of nitrogen gas manufactured from air using a permeable membrane to separate air components. A gas flow measuring device inserted in gas conduits downstream from the membrane monitors nitrogen gas purity by measuring normal flow and detects deviation from desired purity levels by changing gas flow caused by manufacturing apparatus malfunctions.

11 Claims, 2 Drawing Sheets

METHOD AND DEVICE TO MONITOR NITROGEN GAS PURITY DURING THE MANUFACTURE AND DISPENSING OF NITROGEN GAS

This patent application is a continuation-in-part of U.S. Pat. No. 5,688,306 (Ser. No. 08/646,505, filed May 8, 1996) that is a continuation in part of U.S. Pat. No. 5,588,984 (Ser. No. 08/503,596, filed Jul. 18, 1995) the contents of both are hereby incorporated by reference.

BACKGROUND OF THE INVENTION

1. Field of the Invention

The present invention is generally directed to an improved apparatus and method for intermittent manufacturing nitrogen gas, separated from air by using a permeable membrane in an automatic and unattended process. Particularly, the improved method and device adds a gas flow measuring device in a gas conduit downstream from the permeable membrane. The gas flow measuring device indirectly monitors nitrogen gas purity by measuring normal gas flow and detects deviation from desired nitrogen purity levels by measuring changing gas flow from the permeable membrane. The nitrogen and vent gas flow rates from the permeable membrane relate to the nitrogen purity so monitoring either or both the nitrogen and/or vent gas flow indirectly monitors the nitrogen gas purity. The automated process allows non-skilled people to use nitrogen gas from an automatic nitrogen producing apparatus. These people need assurances that the nitrogen gas meets purity requirements.

2. Description of the Prior Art

Nitrogen manufacture from air by separating the oxygen and nitrogen has been accomplished by selective absorbent materials, distillation of liquid air, and membrane separation. These processes produce nitrogen for industrial uses such as chemical manufacture, inert gas welding, purging of explosive environments prior to electric arc cutting or welding, and food preservation. Also, these processes are mostly continuous nitrogen production to the industrial process or to continually fill large storage containers. The prior art is referenced in U.S. Pat. No. 5,588,984.

This U.S. Pat. No. 5,588,984, describes a method and apparatus to intermittently manufacture and dispense nitrogen. Air is filtered, compressed, and enters a module containing a permeable membrane that selectively separates nitrogen from the air and discharges vent oxygen and other gases. Automated temperature and pressure monitors allow the permeable membrane to separate air components. A discharge hose permits use of the nitrogen product for a variety of intermittent applications including vending for inflation of tires, filling portable nitrogen vessels, and use in manufacturing processes.

During the use of this apparatus, debris, moisture, or oil collecting in the membrane may affect the permeable membrane efficiency of separating nitrogen from air. The membrane may need cleaning or other possible malfunctions from the air compressor, temperature, or pressure controls would change the apparatus efficiency or nitrogen purity. In large production and continuous manufacturing of nitrogen for storage or commercial use, a direct purity analysis method uses oxygen analyzers to indicate and monitor nitrogen purity. These oxygen analyzers directly determine the percent of oxygen, using electrochemical fuel cells thereby relating nitrogen purity to oxygen purity. One oxygen analyzer, manufactured by Teledyne, uses an expensive replaceable cell, needs monthly calibration, and is warranted for only six months while having a one year life. The analyzer is not rugged and would present a reliability problem for intermittent nitrogen production. An information sheet concerning these analyzers is enclosed. Oxygen gas analyzers usually require monitoring by manufacturing personnel to maintain the purity of nitrogen in constant flow nitrogen manufacture.

For automatic, intermittent operation by users of nitrogen, unfamiliar with the apparatus, a method and device for signaling an alarm and/or automatic shutdown of the nitrogen manufacturing apparatus is needed if the nitrogen purity is unacceptable. To replace the direct oxygen purity analysis equipment, an indirect monitor device using simple, reliable, and long life flow indicators, pressure monitors, and/or flow switches are used in intermittent apparatus operation down stream of the permeable membrane to monitor the purity of nitrogen gas. These gas flow devices do not require maintenance/and last appreciably longer than one year.

SUMMARY OF THE INVENTION

To provide an automatic, reliable, and low cost system for monitoring and maintaining the nitrogen purity during intermittent and automatic manufacture of nitrogen gas, a gas flow measuring device is inserted into nitrogen and/or oxygen vent conduits. This measuring device would indirectly provide monitoring of the nitrogen purity by monitoring gas flows during operation and signaling gas flow deviation from normal.

During normal operation of the intermittent and automatic manufacture of nitrogen gas, referenced above in U.S. Pat. No. 5,588,984, the permeable membrane in the module normally separates nitrogen from compressed air in a ratio of about one third part nitrogen to about two thirds part vent gas consisting of oxygen, inert gas, and nitrogen. The normal operation of the separation apparatus results in nitrogen production above ninety-nine percent purity. For a normally constant supply of air from the compressor, the respective nitrogen and vent flow remains constant during operation of the nitrogen separation apparatus producing the desired nitrogen purity. However, if the compressor malfunctions, the module is contaminated with water, oil, or debris, or temperature and pressures are not correctly maintained, the nitrogen flow and the gas vent flow would be affected.

When the above problems occur, the gas flow measuring device will determine the higher and/or lower than normal flow. The vent gas amounts or the nitrogen amounts will increase or decrease depending on the apparatus problem thereby indicating a nitrogen separation apparatus problem.

A gas flow rate measuring device, that may be a flow meter, a flow switch or a pressure monitor, is placed in the nitrogen conduit or the gas vent conduit containing mainly oxygen and some nitrogen or in both lines downstream from the permeable membrane. The flow measuring device monitors the normal gas flow and when deviation from normal gas flow happens, these devices can be automated with switches to stop nitrogen production or signal alarms until repairs are made or the permeable membrane cleaned. The gas flow rate measuring device indirectly achieves the same monitoring without a direct gas analyzer now used for monitoring nitrogen purity. They easily offer the possibility of automatically stopping production if predetermined nitrogen gas purity is not produced.

Accordingly, the object of the invention is to provide indirect and low cost nitrogen gas purity monitors, gas flow measuring devices, to assure nitrogen gas production purity from permeable membranes.

Another object of the invention is to automatically signal or stop production of nitrogen gas if predetermined purity levels are not accomplished.

Another object of the invention is to provide nitrogen manufacturing apparatus using permeable membranes a method of quality control without providing trained personal to continually monitor the apparatus.

Another object of the invention is to provide nitrogen manufacturing apparatus using permeable membranes a method of quality control without using gas analyzers.

DETAILED DESCRIPTION OF THE PREFERRED EMBODIMENT

Figure 1:
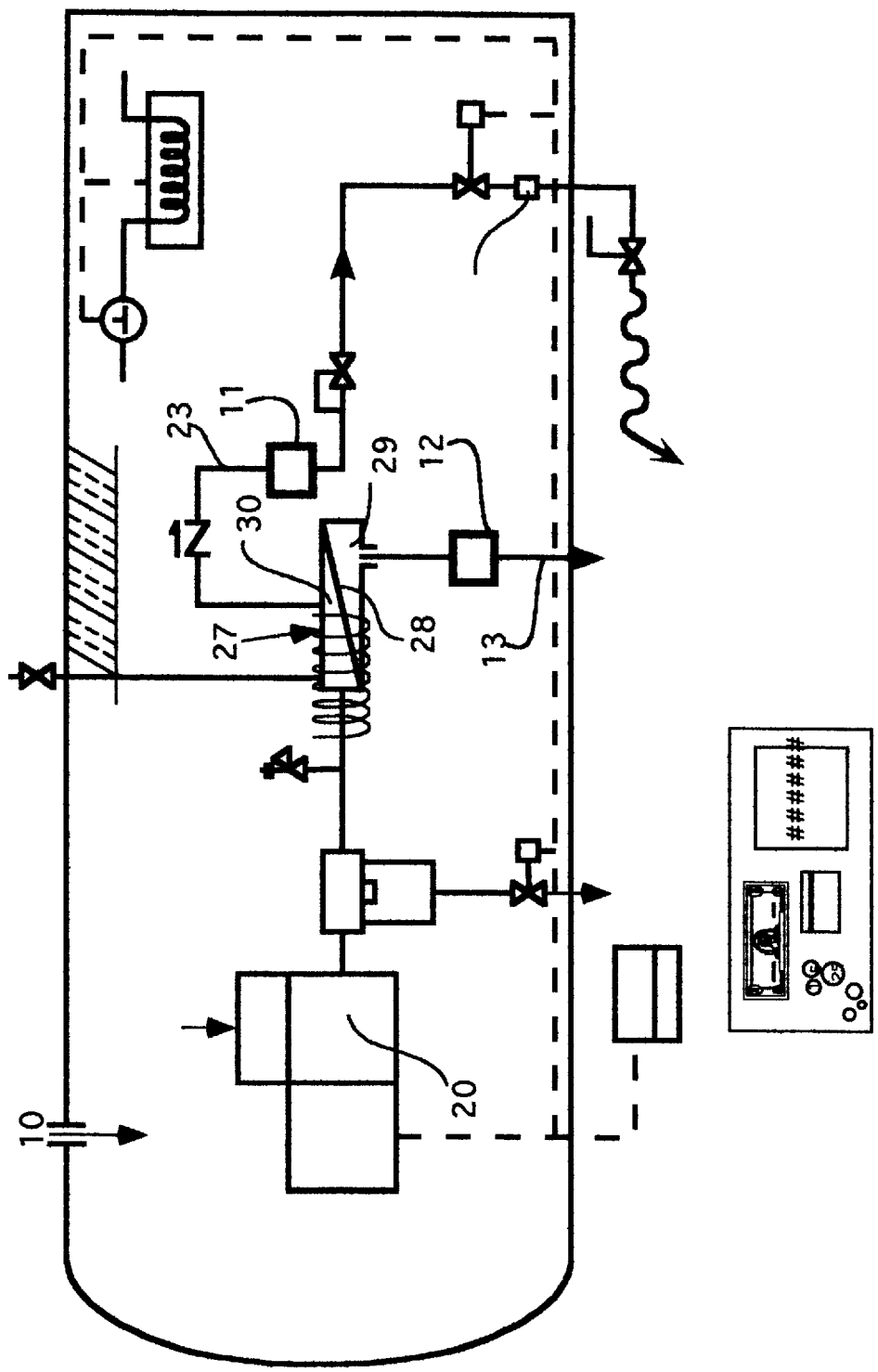
FIG. 1 is a schematic drawing of a method and apparatus to produce nitrogen from air by an intermittent, immediate, automatic, and unattended process using flow measuring devices to indirectly monitor nitrogen purity.

FIG. 1 shows a schematic of the method and apparatus to produce nitrogen by an intermittent and automatic and unattended process described in the referenced patents. The present invention adds to the apparatus an improved method and gas flow measurement device that indirectly monitors nitrogen gas purity by automatically measuring a gas flow and indicating or stopping the manufacturing apparatus if the gas flow falls below a predetermined level. The gas flow or flow rate from a permeable membrane separating nitrogen from air directly relates to gas purity.

FIG. 1, showing a schematic of the nitrogen producing apparatus, shows ambient air 10 entering an air compressor 20. The compressed air then flows through a conduit to a permeable membrane module 27. This module contains a membrane means 28 for essentially separating nitrogen gas 30 from other air components 29. The air enters the module and oxygen, carbon dioxide, moisture, some nitrogen and other gases pass through the membrane means for separating and are purged from the module. The nitrogen flow from the module enriches to desired purity by the removal of other air components and flows out of the module through a conduit 23. The module is maintained at a desired temperature and pressure during the process operation.

Ambient dry air is composed of about 21% oxygen, 78% nitrogen, and 1% of inert gases, carbon dioxide, and miscellaneous other gases by volume. The apparatus module membrane separates nitrogen to about 99% purity with a flow ratio of about ⅓ nitrogen to about ⅔ exit gas that contains some nitrogen as well as the other components of air. Under normal apparatus operation, the nitrogen gas to exit gas flow ratio is constant. However, if the compressor malfunctions, temperature and pressure controls are not normal, or the membrane in the module is contaminated with water, oil, or debris, the vent gas flow or flow rate and the nitrogen product flow or flow rate changes. For example, with module membrane contamination, the vent gas flow decreases and the nitrogen product flow increases, containing excess oxygen, resulting in decreased product purity. Another example would be a ruptured membrane producing increased flow in the vent gas and decreased flow in the nitrogen product. Other malfunctions will increase or decrease the nitrogen or vent gas flow or flow rates thereby indicating apparatus problems. Therefore, either one or both flows or flow rates of the nitrogen gas product and/or the vent gas may be monitored under normal production of essentially pure nitrogen for a constant predetermined flow. When the gas flow or flow rate deviates from the constant flow, the flow measuring device signals a flow change, indicating a problem. In this invention, the parameters monitored including gas flow, gas flow rates, and gas pressure during flow are considered interchangeable and each is covered by this invention.

Figure 2:
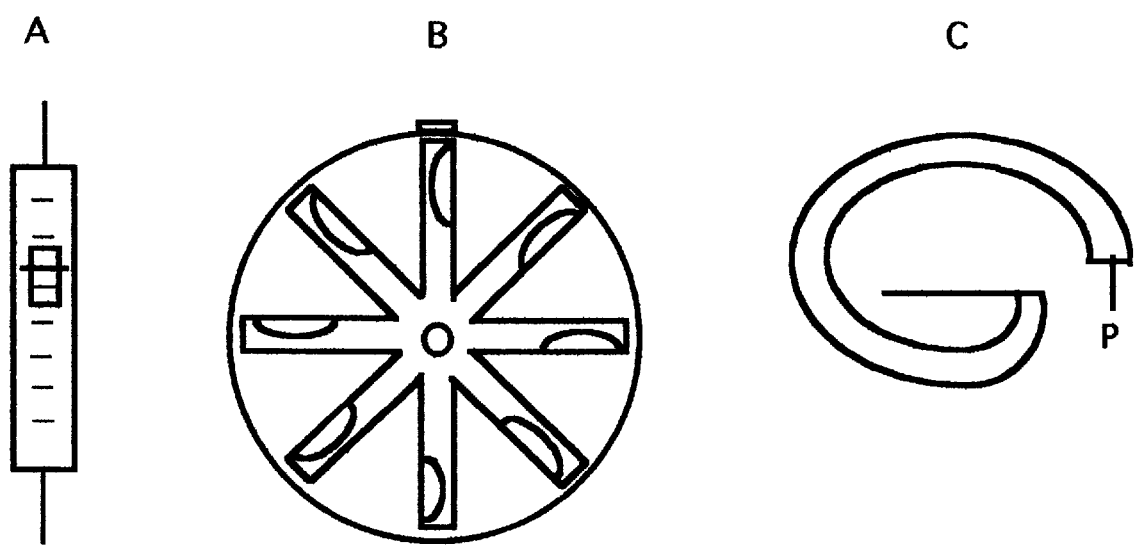
FIG. 2A shows one example of various means for measuring gas flow, specifically a variable area flow meter or rotometer.
FIG. 2B shows another example of various means for measuring gas flow, specifically a turbine.
FIG. 2C shows another example of various means for measuring gas flow, specifically a Bourdon tube.

The present invention, shown in FIG. 1, has a means 11 for measuring the nitrogen gas 30 flow inserted in the nitrogen gas flow conduit 23. The means 11 for measuring the nitrogen gas generates a signal related to gas flow. The signal may begin on or in the means 11 for measuring nitrogen gas flow, commonly known as a flow meter, a flow indicator, or a pressure indicator and/or monitor, each may be with or without a switch. These are shown in FIGS. 2A to 2C as a variable area flow meter or Rotometer, a magnetic flow indicator, a turbine, and a pressure monitor, a Bourdon tube, although other devices known in the art that react to gas flow may also be used. The signal may be remotely sensed from the means 11 for measuring nitrogen gas flow. The means 11 for measuring nitrogen gas flow may initiate a visual display of the gas flow or a signal initiated by either mechanical, magnetic, electrical, pressure, or wave frequency. The wave frequency may be; visual, ultraviolet, or infrared light; sonic, sub sonic, ultrasonic waves; or radio waves of various frequency. Electrical may be alternating or direct current, resistance, voltage, or related to these parameters. Mechanical may use levers or gears. Pressure includes direct readings, pistons, or Bourdon tubes. The signal relates the nitrogen gas flow or gas amount is within or deviates from the desired gas flow rate or gas quantity. The signal may only relate the deviation from the desired flow. Preferably, a gas flow switch with a preset range or amount may also be incorporated in the means 11 for measuring nitrogen gas flow to indicate flow, produce an alarm, or stop the nitrogen gas manufacturing apparatus if the flow rate deviates from a desired preset amount or range. The means may have a single signal listed above or any combination of these signals. Examples of signals for visual would be generated by a rotameter, for magnetic would be a magnetic switch, electrical would be a voltage, pressure would be pressure differentials across flow restrictions, and wave frequency would be audible or non-audible waves although other signals belonging to these groups may be used. The flow amounts may be volume or weight per time unit.

A means 12 for measuring vent gas flow, placed in the vent gas conduit 13 measures the vent gas 29 flow. Means 12 for measuring the vent gas flow generates a signal related to gas flow. This means 12 for measuring vent gas flow rate is identical in description and use as the means 11 for measuring nitrogen gas flow and has the same signal generation shown in FIGS. 2A to 2C and technical parameters described above. The means 12 for measuring vent gas flow may be commonly known as a flow meter, a flow switch, or a pressure monitor. These are shown in FIGS. 2A to 2C as a variable area flow meter, a magnetic flow switch and a Bourdon tube pressure monitor although other devices may also be used.

The means 11 for measuring nitrogen gas flow and the means 12 for measuring vent gas flow can contain the same device or different devices to measure flow based on the device having or using either a turbine, venturi, orifice, paddle wheel, float, piston, Bourdon tube, shuttle, or principles of variable area, pressure changes, vortexes, optics, magnetics, strain, ultrasonics, or densities to produce a signal related to gas flow rates. One variable area flow meter is a Key Instruments Flow Rotameter (Trevose, Pa.) may be used or GEMS flow switch (Plainville, Conn.) may also be used. The GEMS flow switch does not indicate flow but shuts down the apparatus if the flow deviates from a preset amount.

The preferable nitrogen gas purity monitor is means 12 for measuring vent gas flow rate, placed in the vent gas conduit 13, measuring the vent gas 29 flow, and having a GEMS flow switch that monitors the apparatus producing the nitrogen product. However, the means 11 for measuring nitrogen gas flow rate may be used by itself of in combination with means 12 for measuring vent gas flow rate.

Preferably, the nitrogen purity for inflating tires would be set at 95% purity or higher. If the purity is less, detected either by the means 12 for measuring vent gas flow rate or the means 11 for measuring nitrogen flow rate or both, the device would produce a signal to stop apparatus nitrogen production, sound an alarm, or visual alert. Other nitrogen purity values may be used, depending on the end use of the nitrogen product and other signals mentioned above could be used. During start-up of any nitrogen manufacturing apparatus, the flow meters may be inactivated until the normal flow occurs. The present invention can be used on any nitrogen gas or oxygen gas manufacturing apparatus using a permeable membrane to monitor purity of nitrogen or oxygen.

A method for monitoring the purity of nitrogen gas produced by permeable membrane separation of nitrogen from air is first, inserting a means 11 or 12 for measuring gas flow rate in conduit downstream from the permeable membrane module. The means for measuring gas flow may be commonly known as a flow meter, a flow switch, or a pressure monitor. The means for measuring a gas flow rate, either vent gas or nitrogen gas, produces a signal when deviation from normal gas flow occurs. The signal is selected from a group consisting of mechanical, visual, magnetic, electrical, and wave frequency and may also produce a continuous signal for normal gas flow rate. The signal can be used to sound an alarm, usually visual, magnetic, or audio, or shut down the nitrogen manufacturing apparatus.

From the above description of the invention, various changes and modifications to the method and device will occur to those skilled in the art. All such modifications coming from within the scope of the original or amended claims are intended to be included therein.

I claim:

1. A method for monitoring the purity of gas produced by permeable membrane separation of nitrogen from air comprising:
   (a) providing an air compressor for introducing pressurized said air to a module containing a permeable membrane means for separating said nitrogen from said air,
   (b) attaching a permeable membrane means for separating said nitrogen from said air permits oxygen carbon dioxide, water vapor, and other gases to pass through said membrane means for separating while said nitrogen enriches to a desired purity by removal of other air components,
   (c) providing a means for automatic controlling nitrogen pressure in said module,
   (d) providing a means for automatic controlling temperature in said module,
   (e) providing a conduit to contain said air and a conduit to contain said nitrogen in said apparatus when necessary until discharge,
   (f) providing a means for automatically controlling and dispensing desired amounts of said nitrogen and,
   (g) providing a gas flow measuring means in a conduit downstream from said permeable membrane to measure gas flow and generates a signal.

2. A method for monitoring the purity of nitrogen gas produced by permeable membrane separation of nitrogen from air as stated in claim 1 wherein said signal is selected from a group consisting of mechanical, visual, magnetic, electrical, pressure, and wave frequency.

3. A method for monitoring the purity of nitrogen gas produced by permeable membrane separation of nitrogen from air as stated in claim 1 wherein said means for measuring gas flow is selected from a group consisting of a flow meter, a flow switch, and a pressure monitor.

4. A method for monitoring the purity of nitrogen gas produced by permeable membrane separation of nitrogen from air as stated in claim 1 wherein said signal from said gas flow measuring means is selected from a group consisting of mechanical, visual, magnetic, electrical, pressure, and wave frequency.

5. A method for monitoring the purity of nitrogen gas produced by permeable membrane separation of nitrogen from air as stated in claim 1 wherein said means for measuring gas flow in a conduit is selected from a group consisting of a flow meter, a flow switch, and a pressure monitor.

6. An apparatus for monitoring the purity of nitrogen gas produced by permeable membrane separation of nitrogen from air comprising:
   (a) an air compressor for introducing pressurized said air to a module containing a permeable membrane means for separating said nitrogen from said air,
   (b) said permeable membrane means for separating said nitrogen from said air permits oxygen, carbon dioxide, water vapor, and other gases to pass through said membrane means for separating while said nitrogen enriches to a desired purity by removal of other air components,
   (c) a means for automatic controlling nitrogen pressure in said module,
   (d) a means for automatic controlling temperature in said module,
   (e) conduit to contain said air and a conduit to contain said nitrogen gas in said apparatus when necessary until discharge,
   (f) a means for automatically controlling and dispensing desired amounts of said nitrogen and,
   (g) a means for measuring nitrogen gas flow inserted in said nitrogen gas conduit and generates a signal related to said nitrogen gas flow.

7. An apparatus for monitoring the purity of nitrogen gas produced by permeable membrane separation of nitrogen from air as stated in claim 1 wherein said signal is selected from a group consisting of mechanical, visual, magnetic, electrical, pressure, and wave frequency.

8. An apparatus for monitoring the purity of nitrogen gas produced by permeable membrane separation of nitrogen from air as stated in claim 1 wherein said means for measuring nitrogen gas flow inserted in said nitrogen gas conduit is selected from a group consisting of a flow meter, a flow switch, and a pressure monitor.

9. An apparatus for monitoring the purity of nitrogen gas produced by permeable membrane separation of nitrogen from air comprising:

(a) an air compressor for introducing pressurized said air to a module containing a permeable membrane means for separating said nitrogen from said air, (b) said permeable membrane means for separating said nitrogen from said air permits conduit gas vent of oxygen, carbon dioxide, water vapor, some nitrogen, and other gases to pass through said membrane means for separating while said nitrogen enriches to a desired purity by removal of other air components, (c) a means for automatic controlling nitrogen pressure in said module, (d) a means for automatic controlling temperature in said module, (e) a conduit gas vent to contain said air and a conduit gas vent to contain said nitrogen in said apparatus when necessary until discharge, (f) a means for automatically controlling and dispensing desired amounts of said nitrogen and, (g) a means for measuring vent gas flow placed in the conduit gas vent.

10. An apparatus for monitoring the purity of nitrogen gas produced by permeable membrane separation of nitrogen from air as stated in claim 9 wherein said signal is selected from a group consisting of mechanical, visual, magnetic, electrical, pressure, and wave frequency.

11. An apparatus for monitoring the purity of nitrogen gas produced by permeable membrane separation of nitrogen from air as stated in claim 9 wherein said means for measuring conduit vent gas flow is selected from a group consisting of a flow meter, a flow switch, and a pressure monitor.

* * * * *